Jan. 4, 1955  S. A. GOUDSMIT  2,698,905
MAGNETIC TIME-OF-FLIGHT MASS SPECTROMETER
Filed March 24, 1949  3 Sheets-Sheet 1

INVENTOR.
SAMUEL A. GOUDSMIT
BY
Roland A. Anderson
Attorney

Jan. 4, 1955  S. A. GOUDSMIT  2,698,905
MAGNETIC TIME-OF-FLIGHT MASS SPECTROMETER
Filed March 24, 1949  3 Sheets-Sheet 2

INVENTOR.
SAMUEL A. GOUDSMIT
BY

Jan. 4, 1955　　　S. A. GOUDSMIT　　　2,698,905
MAGNETIC TIME-OF-FLIGHT MASS SPECTROMETER
Filed March 24, 1949　　　3 Sheets-Sheet 3

*INVENTOR.*
SAMUEL A. GOUDSMIT
BY

United States Patent Office 2,698,905
Patented Jan. 4, 1955

2,698,905

MAGNETIC TIME-OF-FLIGHT MASS SPECTROMETER

Samuel A. Goudsmit, Sayville, N. Y., assignor to the United States of America as represented by the United States Atomic Energy Commission Application March 24, 1949, Serial No. 83,258

4 Claims. (Cl. 250—41.9)

The present invention relates to a method and apparatus for measuring the mass of ions. It is known that ions traveling in a magnetic field in such direction as to cross the lines of flux thereof are caused to curve in their path due to the force exerted on the ions by the magnetic field. Conventional mass spectrometers make use of the separating property of a magnetic field which causes ions of different mass to describe different paths in passing through the field. According to previously disclosed methods of measuring the mass of ions the ions are allowed to remain under the influence of the magnetic field for sufficient time only to be substantially separated in their paths of flight as a result of the difference in weight. By contrast advantage is taken, according to the present method, of the difference of time of flight of ions of different weight in a magnetic field.

It is an object of the present invention to provide a method of measuring the mass of ions.

It is another object of the present invention to provide a method for accurately measuring the heavier ions.

It is a further object of the present invention to provide an apparatus suitable for carrying out the present method.

The present invention makes use of the tendency of a magnetic field to focus ions emitted from a point in the field at points aligned with the point of emission along lines of flux of the field so that all ions of the same mass and charge are focused at points on the line at the same time regardless of the paths which they may follow in other portions of the magnetic field. The present invention may be more clearly described with reference to the figures wherein.

In one of its broader aspects the objects of the present invention are achieved by emitting ions from a source in a substantially uniform magnetostatic field so that they travel through generally helically shaped paths, collecting the ions at a focal point located on one of the flux lines intersecting the ion source, and measuring the difference in time of flight of different ions to said focal point.

Figure 1:
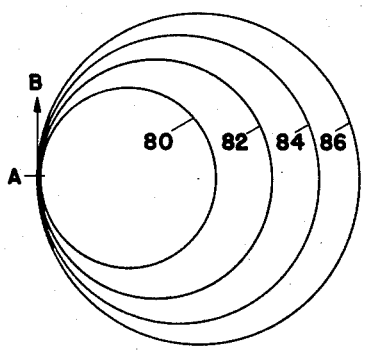
Figure 1 is an illustration of the paths of ions having different momenta which are emitted in a single direction in a magnetic field, said ions traveling in a plane which is perpendicular to the lines of flux of the field.

Referring specifically to Figure 1, ions which are emitted from a point A in a given direction of flight as, for example, toward the point B, will be caused to describe a generally circular path 80, 82, 84 or 86 in the field and thereby to return to the point A from which they were emitted. This result obtains if the circular paths which the ions describe are in a plane which is perpendicular to the lines of flux of the magnetic field. The difference in the radii of the paths of the ions may result from a difference in their mass if they all have the same velocity, or may result from the difference in the velocity if they all have the same mass. A combination of difference in mass and difference in velocity may also produce the same patterns. However, it will be noted that regardless of the energy or the mass of ions they all return to the point A from which they were emitted if they are all emitted in the same direction and all travel in a plane which is perpendicular to the lines of flux of the magnetic field.

Figure 2:
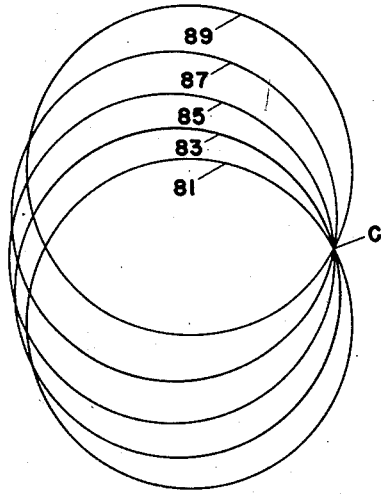
Figure 2 is an illustration of the paths of ions having the same momenta which are emitted in a number of directions in the magnetic field, said ions traveling in a plane which is perpendicular to the lines of flux of the field.

Referring now to Figure 2 the ions emitted from a point C in different directions in a plane which is perpendicular to the lines of flux of a uniform magnetostatic field describe circular paths 81, 83, 85, 87 and 89. It will be noted that all of the ions focus at the point of emission C regardless of the direction in the plane in which they are emitted. This result follows from the fact that all ions traveling with a uniform velocity in a magnetostatic field in a plane which is plane perpendicular to the lines of flux of the field describe circular paths and therefore return to the point of emission.

The focusing described with reference to Figures 1 and 2 occurs whenever ions travel in planes which are plane perpendicular to the lines of flux of the field and the focusing effect is independent of the direction of the initial emission of the particles as well as of the mass and energy of the particles emitted. However, the time of arrival at the source of ions emitted from the source at the same time is dependent on the velocity of the particles and the curvature of the path of the particles through the magnetic field or a combination of these two. The time of arrival may be similarly expressed as dependent on the factors which determine the velocity, such as charge, mass and applied accelerating voltage and upon the curvature determining factors such as the field strength, charge and mass. The ions having different weight and the same velocity will follow different paths of curvature in the magnetic field and will arrive at the focal point at different times. The heavier ions will describe circles having larger radii and, in traveling through greater distance at a given velocity, will take longer to arrive at the focal point than the lighter ions which describe smaller circles at the same velocity. Ions of the same weight which are accelerated to different velocities will all arrive at the focal point at the same time because those traveling at greater velocity will describe larger circles and those traveling at smaller velocity will describe smaller circles but, since the angular velocity of ions of the same weight in a uniform magnetostatic field is a constant, all ions of the same weight and emitted at the same time will therefore arrive at the focal point after the same period of travel. According to the present invention the difference in the weight of ions is measured by measuring the difference in their time of flight in a uniform magnetostatic field.

If ions are emitted from the plane perpendicular to the lines of flux but at an angle which is slightly displaced from the plane, they will describe paths which have a generally helical shape and which will have points of focus displaced in either direction from the source along the lines of flux passing through the source. For the purposes of the subject application and claims the flux lines passing through the source will be referred to as the focal lines of flux or simply as the focal lines. The ions may follow different paths of curvature due to the different masses, different velocities or different directions of emission with respect to the plane but they will all focus at points along the focal lines of flux. However, the time of flight for different ions will not all be the same but will vary depending on the velocity of the ions and radius of curvature of the ion path in the magnetostatic field or, expressed in another way, on the mass, charge and field strength factors which determine the velocity and radius of curvature. For example, ions accelerated to the same velocities but having lighter masses will be curved in the magnetic field through circles of smaller radii and will therefore arrive at the focal lines of flux earlier than the heavier ions which travel at the same velocity through circles of larger radii. On the other hand, if the same momentum is imparted to ions of different mass they will describe paths in the magnetic field having substantially equal radii but the lighter ions will travel faster and will arrive at the focal lines of flux earlier than the slower moving heavier ions. According to the present invention, in one of its broader aspects measurement is made of the difference in the mass of ions by causing them to travel in generally helically shaped paths through a magnetostatic field and measuring the difference in the time of flight of the ions through an integral number of turns of the helix.

It has been found that the mass of ions is related to their time of flight in a given magnetostatic field by the following relation:

$$T = 652 M/H$$

where T is the time in microseconds, M is the mass in atomic weight units, and H is the field strength of the magnetic field in gauss or oersteds. If the field strength, H, and the time of flight, T, are known the mass of the ions can be calculated. However, it is found preferable to measure the difference in time of flight between an ion of known weight and an ion of unknown weight. Since the time of flight of an ion of known mass in a field of known strength is known and the difference in time of flight is measured, the mass of the other ion may be computed.

To effect the objects of the present invention in one of its broader aspects it is necessary to provide a source of ions in an evacuated chamber which is permeated by a uniform magnetostatic field, to provide means for imparting a desired velocity to ions and for detecting the instant of arrival of ions at the focal lines through the collecting of such ions at the focal lines after they have described a generally helical path in the chamber, and to provide means for measuring the difference in time of arrival of the ion pulses. Such apparatus is described with reference to the figures.

Figure 9:
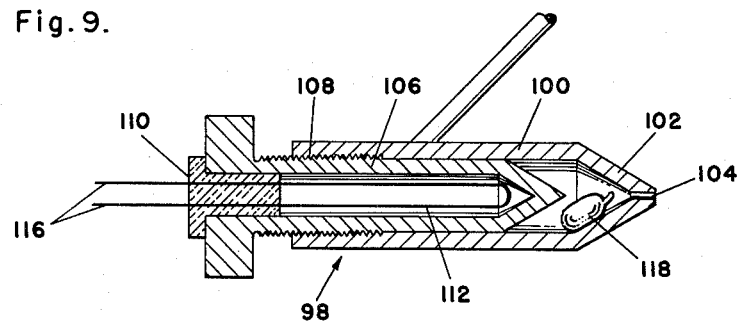
Figure 9 is an axial section of a vapor gun employed in directing a stream of vapor against the heated plate of the source.

Referring specifically to Figure 9 a stream of a desired vapor is produced from the vapor gun 98 by heating a volatile substance deposited in the gun by breaking a capsule 118 in an enclosure formed between the end of a movable plunger 106 and the inner surface of the hollow core of a cylinder 100. The vapor generated by the heat is ejected from the chamber through the port 104 in the conical end 102 of the hollow cylinder 100. The heat is supplied to the vapor gun from the filament 112 which is electrically heated by connecting it with a suitable source of electric current (not shown) at the conduits 116. The filament is supported in a heat resistant electrical insulator such as a ceramic plug 110 which is inserted in the open end of the hollow core of the plunger 106. The plunger may be caused to move into or out of the hollow core of the cylinder 100 by rotation of these two members with respect to each other, the threaded portion 108 of the plunger 106 and casing 100 serving to cause the axial motion. This motion is employed in breaking the capsule 118.

Figure 11:
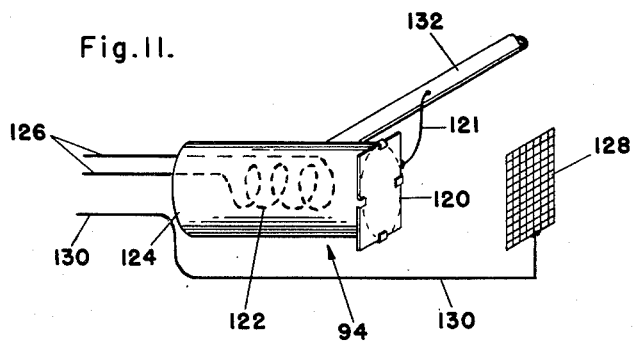
Figure 11 is a perspective view of an ion source including the heating element in phantom and an accelerating grid.

The gas issuing from the orifice in the cylinder 100 is preferably ionized by passing it into contact with a heated metal plate. With reference to Figure 11, ions of the gas may be formed at the ion source 94 by causing the vapor to flow against the plate 120 which is electrically heated by the resistance metal coil 122 shown in phantom within the ceramic container 124. The plate 120 and the coil 122 are preferably made of a high resistance metal such as tungsten and the coil 122 is heated by impressing an electrical voltage across the conductors 126 thereof from a suitable source (see Figure 4). In order to impart a velocity to the ions formed in contacting the heated plate 120, a voltage drop is impressed between the plate 120 and the grid 128 which is displaced from the plate 120 a suitable distance such as a centimeter. Other distances and materials may obviously be used in the elements of Figure 11 as, for example, a separation of from less than one centimeter to several centimeters is within the scope of the present invention. Also the grid 128, the plate 120 and the coil 122 may be composed of other high resistance metals such as Nichrome, constantan and the like. The charge on the grid 128 is supplied through the electrical conductor 130 which also acts as a support for the grid. The ion source 94 is supported in the chamber by supporting rod 132 which also connects the plate 120 with the chamber exterior, electrical connection being made between the plate 120 and rod 132 by the conductor 121.

Figure 10:
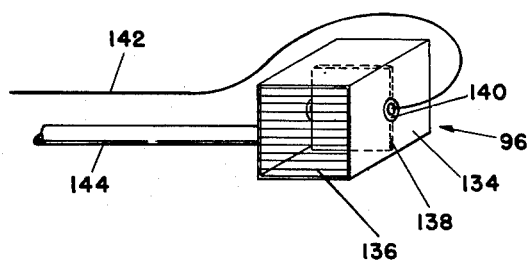
Figure 10 is a perspective view showing an ion collector Faraday box in part in phantom.

The ions accelerated from the source are collected after having described a generally helical path in the evacuated chamber. A suitable collector box 96 known as a Faraday box is illustrated in Figure 10. The Faraday box consists essentially of a metal rectanguloid box 134 having one of its ends open and having a number of strands of wire 136 stretched across the open end of the box, and a metal plate 138 supported internally in insulated relation to the metal box 134 by the insulating supports 140. The plate is electrically connectable to a current measuring device (not shown) through the electrical lead 142. The box 134 is supported in the chamber by the rod 144.

Figure 3:
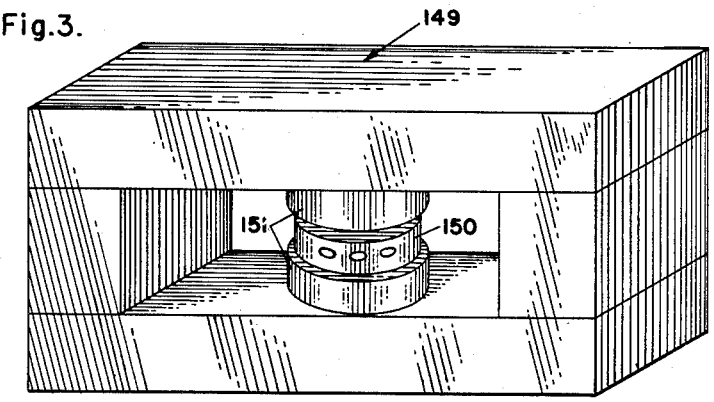
Figure 3 is a perspective view of a vacuum container in position between the poles of a magnet suitable for use in carrying out the method of the present invention.

The relation of these elements 94, 96 and 98 may be most clearly explained with reference to Figures 3, 4, 5 and 6. The elements are supported on the cylindrical wall of a relatively shallow cylindrical container 150. In order to provide a flight of ions which may describe a generally helical path within the evacuated chamber enclosed by the container 150 the vapor gun 98 and the ion source 94 are disposed at a lower level in the container 150 and the collector 96 is disposed at an upper level. The container 150 may be evacuated by exhausting the gas therefrom through the conduit 152 which is connected to a suitable pump (not shown). The container 150 may be disposed between the jaws of any magnet capable of maintaining a suitable magnetostatic field so as to permeate the chamber enclosed by the container. Referring to Figure 3 the magnetic field may be that, for example, supplied by a permanent magnet 149 between the centrally located cylindrical jaws 151 thereof.

In order to make the measurements of the time of flight of ions in the evacuated chamber it is necessary to interrupt the emission of ions so that they are emitted in short accurately timed pulses. However, it is not necessary to know the exact time which passes between the emission of a pulse of ions and its arrival at the collector box although such measurement may be made. Rather it is sufficient to measure the difference in the time of arrival of an ion of known weight and one the weight of which is to be determined as explained above. Conventional electronic timing mechanisms may be employed for this operation.

Figure 4:
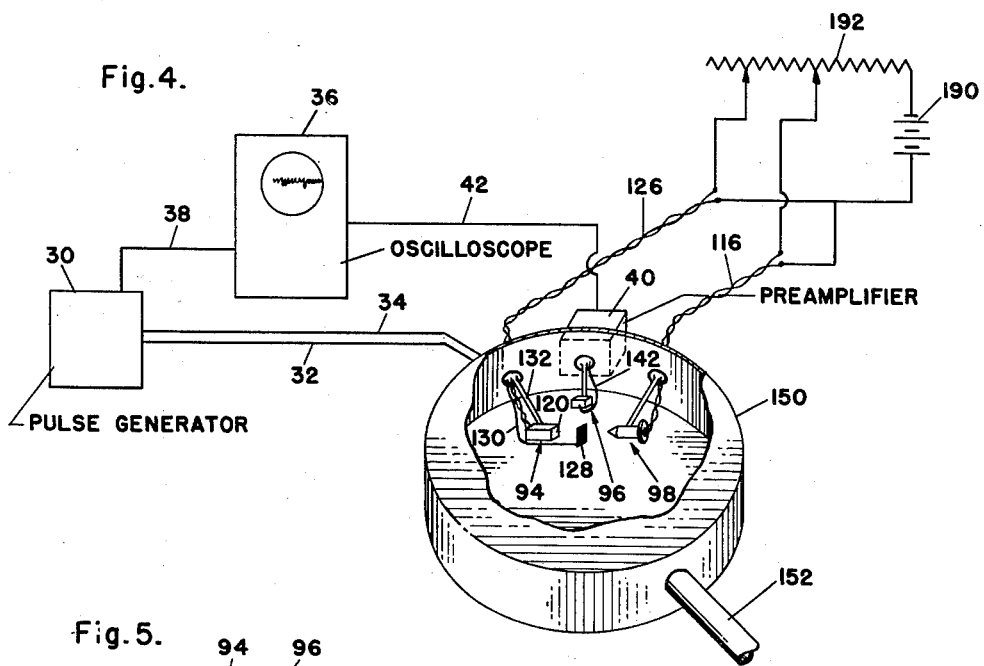
Figure 4 is a perspective view in part cutaway of the container which is disposed between the magnet poles of the magnet of Figure 3 and auxiliary apparatus.

With reference specifically to Figure 4 a pulse generator 30 may be employed to impress a voltage between the grid 128 and the plate 120 through the electrical conductors 32 and 34 respectively. The conductor 32 connects the pulse generator 30 through the conductor 130 to the grid 128. The conductor 34 connects the pulse generator 30 through the conducting rod 132 to the plate 120. At the same time that the pulse is initiated in the pulse generator 30 the horizontal sweep on the oscilloscope 36 is started by a pulse received from the pulse generator 30 through the conductor 38. The pulse generator may be, for example, one which is capable of generating pulses lasting a fraction of a microsecond and repeating the pulse at regular intervals. The time of arrival of a pulse of ions at the collector plate after having made a helical turn in the chamber 150 is indicated on the oscilloscope 36 by a dip in the sweep line of the oscilloscope. For this purpose the oscilloscope sweep line is made to assume a serrulate formation, each serrulation of which indicates an increment of time. The serrulations may be set at desired values, usually multiples or fractions of one microsecond. If the pulse is repeated at sufficiently short intervals the dip in the sweep line corresponding to the arrival of the ion pulse will appear as a standing wave. In order that the pulse received at the collector plate is not excessively diminished in its transmission to the oscilloscope, a preamplifier 40 is provided at the container wall where the electrical connection 140 from the plate 138 leaves the evacuated chamber. The preamplifier 40 amplifies the pulse received from the collector plate and the amplified pulse is transmitted to the oscilloscope through the conductor 42. Heating of the filament 112 is provided by flowing a current from the source 190 through potential divider 192 and the electrical conductors 116. Heat is also supplied to the coil 122 in the ion source 94 by flowing current from the source 190 through the potential divider 192 and the conductors 126.

The instrument is particularly useful in connection with the study of the relative weights of isotopes since the dips in the sweep line representing each of the isotopes will appear at the same time. The present instrument has greater advantage for the measurement of the isotopes of the heavier elements than previously disclosed spectrometers which depend on the spacial separation of the ions because the heavier ions, while but slightly separated spacially under the influence of a magnetic field, take longer in making a single turn of a given radius in the evacuated chamber than do the lighter elements and therefore have a longer time to become separated with respect to their time of arrival at the collector plate.

The alignment of the source and the collector along the lines of flux has not been found to be critical. That is, the grid of the source need not be located exactly along the same lines of flux as the opening of the Faraday box. Also, the direction of emission of the ions from the source is not critical, the ions being emitted therefrom in slightly divergent directions. Sufficient ions travel along the helical path which causes their arrival at the Faraday box after one turn of the helical path to cause a dip in the sweep line. From such a source ions are also emitted at a more shallow angle with respect to the plane perpendicular to the lines of flux of the magnetic field than the ions arriving after one helical turn, and a sufficient number of such shallow angle ions make an integral number of helical turns before arriving at the Faraday box, to cause later dips in the sweep line. If a sweep line corresponding to a sufficiently long period of time is used a dip will occur representing the arrival of a pulse which has made one helical turn, and dips will occur representing the arrivals of pulses for each integral number of helical turns.

Figure 5:
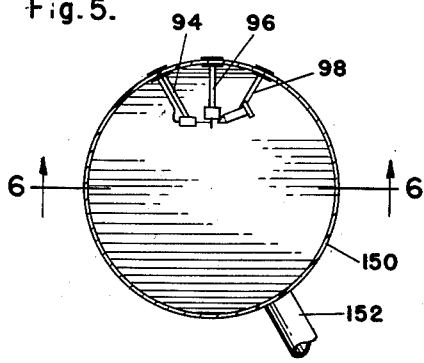
Figure 5 is a horizontal section of the container of Figure 6 taken on a line 5—5 of Figure 6.
Figure 6:
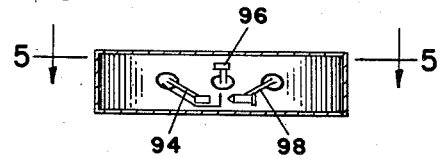
Figure 6 is a vertical section of Figure 5 taken on a line 6—6 of Figure 5.

One such apparatus which operates with high efficiency may be described as follows. A stream of rubidium vapor is caused to issue from a vapor gun 98 by heating the gun to from 125° C. to 150° C. Heat is provided by means of the filament 112 and the rubidium metal is initially introduced into the gun in a sealed vial 118. Ionization is caused by directing the stream of vapor against a plate 120 which is heated to approximately 1000° C. The gun, ion source and ion collector were suitably disposed as indicated in Figures 4, 5 and 6 in an evacuated cylindrical container having a diameter of about 15 inches and a depth of about 2 inches. The pressure in the container is maintained at less than 5 microns of mercury. The ions are accelerated by impressing a voltage of approximately 150 volts between the plate 120 and the grid 128. The voltage is impressed for approximately ¼ of a microsecond every millisecond and the separation between the plate 120 and grid 128 is approximately one centimeter. When the field strength used is approximately 600 gauss the rubidium ions take approximately 70 microseconds in passing from the source to the collector through this field and they describe a helical path having a diameter of about 8 inches.

It will be understood, however, that the method of the present invention is not limited to the specific values indicated. Whereas the preferred field intensity is in the neighborhood of between 500 and 2000 gauss a field strength of between 100 and 6000 may be used. The radius of the ion paths will, of course, depend on the strength of the voltage used in accelerating the ions, the length of time over which it is applied and the strength of the magnetic field. Generally, it is thought that allowing the ions to make at least 10 helical turns before being collected will give satisfactory time of flight measurements. As many as 100 helical turns may be used. A separation of grid and plate of from one-half to two centimeters is thought to be the most practical range.

Figure 7:
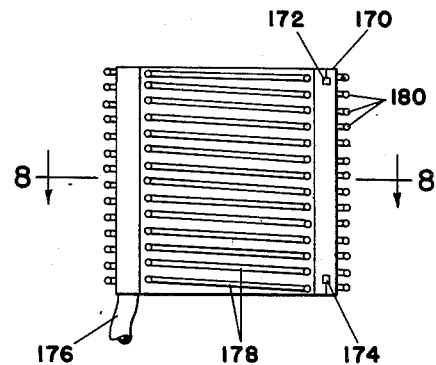
Figure 7 is a vertical section of Figure 8 taken on a line 7—7 of Figure 8 and illustrating an annular container and helical windings in their relation thereto.
Figure 8:
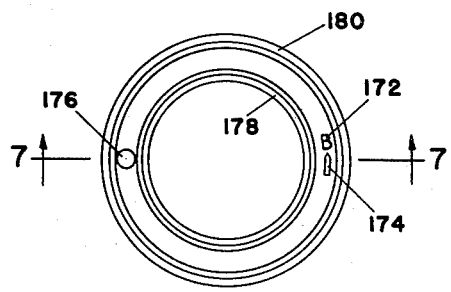
Figure 8 is a horizontal section of Figure 7 taken on a line 8—8 of Figure 7 and illustrating the ion source in place.

Other formations of the apparatus which provide a relatively uniform magnetostatic field and an ion source and collector aligned along this magnetic field will be apparent to those familiar with the art. One such arrangement is illustrated in Figures 7 and 8. According to this scheme an annular container 170 is provided with a collector plate 172 disposed along a line parallel to the axis of the ring from an ion source 174 at opposite ends of the container. The container is evacuated through a conduit 176 by a pump (not shown). A uniform magnetostatic field which permeates the evacuated ring chamber 180 is provided by passing a suitable current through an internal helical winding 178 and an external helical winding 180. In using this type of container it is preferred to impart a uniform momentum to the ions accelerated so that all the ions will describe paths of approximately equal radius as explained above, though their time of flight between the source and the collector will be different for ions of different weight. A uniform momentum may be imparted to the ions accelerated by subjecting them to an electrostatic field for a fraction of the time necessary to cause them to reach the screen 128 in traveling from the plate 120. Substantially all such ions have uniform momenta because they have the same charge and have been subjected to a uniform electrostatic field for the same length of time. An equal accelerating force is thus applied to each of the ions accelerated.

Still other equivalents will be obvious to those familiar with the art since other methods of providing uniform magnetostatic fields are known in the art and previously disclosed ion sources and ion collectors may be substituted for those described above.

Since many embodiments might be made of the present invention and since many changes might be made in the embodiment described, it is to be understood that the foregoing description is to be interpreted as illustrative only and not in a limiting sense.

I claim:

1. A mass spectrometer for the measurement of ion masses which comprises in combination a chamber adapted to be evacuated, a uniform magnetic field within said chamber, an ion source and an ion collector within the magnetic field within said chamber, said source and ion collector being aligned along the flux lines of said magnetic field, means for causing ions to be emitted from said ion source at an angle to the magnetic flux lines in pulses at predetermined intervals and means for measuring the time of travel of said ions from said source to said collector.

2. A mass spectrometer for the measurement of ion masses which comprises in combination a cylindrical chamber adapted to be evacuated, a magnet disposed with respect to said chamber so as to cause lines of flux to permeate said chamber, said lines of flux being parallel to the axis of said cylinder, an ion source and an ion collector within the magnetic field within said chamber, said source and ion collector being aligned along the flux lines of said magnetic field, means for causing ions to be emitted from said ion source at an angle to the magnetic flux lines in pulses at predetermined intervals and means for measuring the time of travel of said ions from said source to said collector.

3. A mass spectrometer for the measurement of ion masses which comprises in combination a chamber adapted to be evacuated, a uniform magnetostatic field of between 100 and 6000 gauss within said chamber, an ion source and an ion collector within the magnetic field within said chamber, said source and ion collector being aligned along the flux lines of said magnetic field, means for causing ions to be emitted from said source at an angle to the magnetic flux lines in pulses at predetermined intervals and means for measuring the difference in time of arrival of said ions at said collector.

4. A mass spectrometer for the measurement of ion masses which comprises in combination a chamber adapted to be evacuated, a uniform magnetostatic field of between 500 and 2000 gauss within said chamber, an ion source and an ion collector within the magnetic field within said chamber, said source and ion collector being aligned along the flux lines of said magnetic field, means for causing ions to be emitted from said source at an angle to the magnetic flux lines in pulses at predetermined intervals and means for measuring the difference in time of arrvial of said ions at said collector.

References Cited in the file of this patent
UNITED STATES PATENTS

| 2,297,305 | Kerst | Sept. 29, 1942 |
| 2,331,189 | Hipple, Jr. | Oct. 5, 1943 |
| 2,378,936 | Langmuir | June 26, 1945 |

OTHER REFERENCES

Stephens: Bulletin of the American Physical Society, vol. 21, No. 2, April 25, 1946, page 22.